(12) United States Patent
Raveh et al.

(10) Patent No.: US 10,320,952 B2
(45) Date of Patent: Jun. 11, 2019

(54) SYSTEM-WIDE SYNCHRONIZED SWITCH-OVER OF MULTICAST FLOWS

(71) Applicant: MELLANOX TECHNOLOGIES TLV LTD., Raanana (IL)

(72) Inventors: Aviad Raveh, Bat Hefer (IL); Gil Bloch, Zichron Yaakov (IL); Richard Mark Hastie, Nantwich (GB); Asaf Wachtel, Fairlawn, NJ (US)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 5 days.

(21) Appl. No.: 15/590,022

(22) Filed: May 9, 2017

(65) Prior Publication Data

US 2017/0331926 A1     Nov. 16, 2017

Related U.S. Application Data

(60) Provisional application No. 62/336,763, filed on May 16, 2016.

(51) Int. Cl.
*H04L 29/06* (2006.01)
*H04L 12/18* (2006.01)
(Continued)

(52) U.S. Cl.
CPC .......... *H04L 69/14* (2013.01); *H04L 12/1881* (2013.01); *H04Q 11/0478* (2013.01); *H04L 2012/5667* (2013.01)

(58) Field of Classification Search
CPC ..... H04L 12/4658; H04L 45/00; H04L 47/56; H04L 49/1576; H04L 12/1881; H04L 69/14; H04L 2012/5667
See application file for complete search history.

(56) References Cited

U.S. PATENT DOCUMENTS

| | | | |
|---|---|---|---|
| 6,349,097 B1* | 2/2002 | Smith | H04L 49/1576 370/390 |
| 2008/0068986 A1* | 3/2008 | Maranhao | H04L 45/00 370/220 |

(Continued)

OTHER PUBLICATIONS

Edwards., "P4 for Media (Programming Protocol-Independent Packet Processors)", FOX Networks Engineering & Operations, 17 pages, Oct. 5, 2016.

(Continued)

*Primary Examiner* — Benjamin H Elliott, IV
*Assistant Examiner* — Prince A Mensah
(74) *Attorney, Agent, or Firm* — Kligler & Associates

(57) ABSTRACT

A network device includes multiple ports, for communicating over a communication network, and packet processing circuitry. The packet processing circuitry is configured to receive via the ports packets belonging to a plurality of multicast flows, to receive, for each of the multicast flows, (i) a first configuration that specifies clients that are to receive the multicast flow prior to a specified switch-over time, and (ii) a second configuration that specifies the clients that are to receive the multicast flow after the specified switch-over time, to forward the multicast flows via the ports in accordance with the first configuration, to extract from a field in at least one of the packets a value that is indicative of the switch-over time, and, based on the extracted value, to switch-over forwarding of the multicast flows from the first configuration to the second configuration simultaneously at the switch-over time.

18 Claims, 3 Drawing Sheets

(51) Int. Cl.
*H04Q 11/04* (2006.01)
*H04L 12/70* (2013.01)

(56) References Cited

U.S. PATENT DOCUMENTS

| | | | | |
|---|---|---|---|---|
| 2009/0010152 | A1* | 1/2009 | Ofek | H04L 47/56 370/216 |
| 2009/0320084 | A1* | 12/2009 | Azam | H04N 7/17318 725/120 |
| 2012/0324519 | A1* | 12/2012 | Laughlin | H04N 21/23439 725/95 |
| 2015/0156108 | A1* | 6/2015 | Shi | H04L 12/4658 370/218 |

OTHER PUBLICATIONS

Mizrahi et al., "Timed Consistent Network Updates in Software-Defined Networks", IEEE/ACM Transactions on Networking, vol. 24, No. 6, pp. 3412-3425, Dec. 2016.

Schulzrinne et al., "RTP: A Transport Protocol for Real-Time Applications", RFC 3550, 89 pages, Jul. 2003.

802.1Q standard, "IEEE standard for Local and Metropolitan Area Networks-Virtual Bridged Local Area Networks", 303 pages, May 19, 2006.

Cain et al., "Internet Group Management Protocol", Version 3, RFC 3376, 53 pages, Oct. 2002.

Gharai et al., "RTP Payload Format for Uncompressed 5 Video", RFC 4175, 15 pages, Sep. 2005.

\* cited by examiner

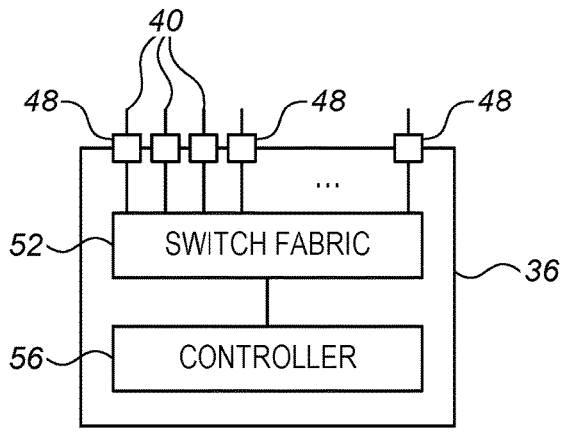
FIG. 2
FIG. 3
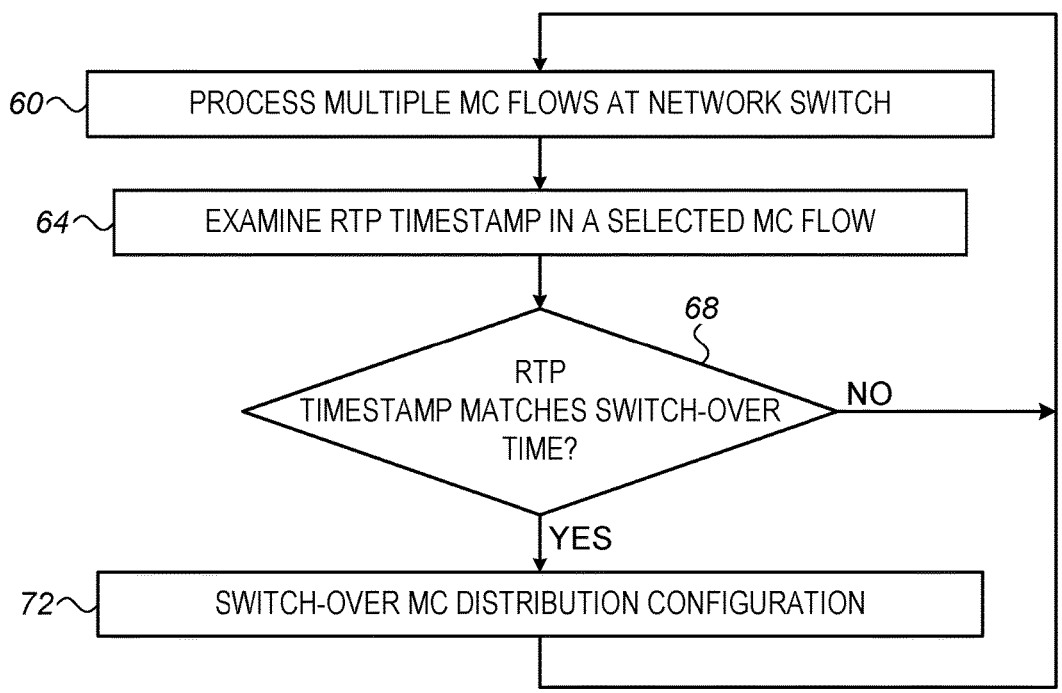

SYSTEM-WIDE SYNCHRONIZED SWITCH-OVER OF MULTICAST FLOWS

CROSS-REFERENCE TO RELATED APPLICATIONS

This application claims the benefit of U.S. Provisional Patent Application 62/336,763, filed May 16, 2016, whose disclosure is incorporated herein by reference.

FIELD OF THE INVENTION

The present invention relates generally to communication networks, and particularly to methods and systems for synchronized switch-over of multicast flows.

BACKGROUND OF THE INVENTION

Various communication systems, applications and protocols transmit data to multiple recipients using multicast packet flows. Multicast is used extensively, for example, in media production and distribution applications, and in IP television (IPTV).

Several protocols have been specified for managing multicast groups. One such protocol is the Internet Group Management Protocol (IGMP), which is specified by the Internet Engineering Task Force (IETF), for example in "Internet Group Management Protocol, Version 3," Request For Comments (RFC) 3376, October, 2002, which is incorporated herein by reference. Another example protocol is Multiple MAC Registration Protocol (MMRP). MMRP is specified in IEEE Standard 802.1Q-2005, entitled "IEEE Standard for Local and Metropolitan Area Networks—Virtual Bridged Local Area Networks," May 19, 2006, which is incorporated herein by reference.

One popular protocol for sending media content such as audio and video over Internet Protocol (IP) networks is the Real-time Transport Protocol (RTP). RTP is specified by the IETF in "RTP: A Transport Protocol for Real-Time Applications," RFC 3550, July, 2003, which is incorporated herein by reference. RTP payload format structure and format, and in particular the RTP timestamp, are specified in "RTP Payload Format for Uncompressed Video," RFC 4175, September, 2005, which is incorporated herein by reference.

SUMMARY OF THE INVENTION

An embodiment of the present invention that is described herein provides a network device including multiple ports, for communicating over a communication network, and packet processing circuitry. The packet processing circuitry is configured to receive via the ports packets belonging to a plurality of multicast flows, to receive, for each of the multicast flows, (i) a first configuration that specifies clients that are to receive the multicast flow prior to a specified switch-over time, and (ii) a second configuration that specifies the clients that are to receive the multicast flow after the specified switch-over time, to forward the multicast flows via the ports in accordance with the first configuration, to extract from a field in at least one of the packets a value that is indicative of the switch-over time, and, based on the extracted value, to switch-over forwarding of the multicast flows from the first configuration to the second configuration simultaneously at the switch-over time.

In some embodiments, the multicast flows include Real-time Transport Protocol (RTP) media flows, and the extracted value includes an RTP timestamp. In an embodiment, the multicast flows convey video frames, and the packet processing circuitry is configured to determine a video-frame boundary based on the extracted value, and to switch-over to the second configuration at the video-frame boundary.

In a disclosed embodiment, the packet processing circuitry is configured to extract the value from a single selected multicast flow, and to switch-over all the multicast flows to the second configuration at the switch-over time indicated by the single selected multicast flow. In an example embodiment, the packet processing circuitry is configured to determine the switch-over time, and to switch-over to the second configuration, irrespective of time synchronization with any other network device.

In example embodiments, the packet processing circuitry includes a table, which holds a rule that triggers a switch-over to the second configuration based on the extracted value. In an embodiment, the packet processing circuitry is configured to delete the rule from the table after the switch-over to the second configuration has been triggered.

In some embodiments, the packet processing circuitry is configured to forward the multicast flows by looking-up a table, which points to the first configuration prior to the switch-over time and to the second configuration after the switch-over time. In an embodiment, in response to a decision to switch-over to the second configuration, the packet processing circuitry is configured to update the table to point to the second configuration.

There is additionally provided, in accordance with an embodiment of the present invention, a method including receiving in a network device packets belonging to a plurality of multicast flows. First and second configurations are received in the network device for each of the multicast flows. The first configuration specifies clients that are to receive the multicast flow prior to a specified switch-over time, and the second configuration specifies the clients that are to receive the multicast flow after the specified switch-over time. The multicast flows are forwarded in accordance with the first configuration. A value, which is indicative of the switch-over time, is extracted from a field in at least one of the packets. Based on the extracted value, forwarding of the multicast flows is switched-over from the first configuration to the second configuration simultaneously at the switch-over time.

The present invention will be more fully understood from the following detailed description of the embodiments thereof, taken together with the drawings in which:

BRIEF DESCRIPTION OF THE DRAWINGS

FIG. 2 is a block diagram that schematically illustrates a network device, in accordance with an embodiment of the present invention;

FIG. 3 is a flow chart that schematically illustrates a method for synchronized switch-over of multicast flows, in accordance with an embodiment of the present invention.

DETAILED DESCRIPTION OF EMBODIMENTS

Overview

Figure 1:
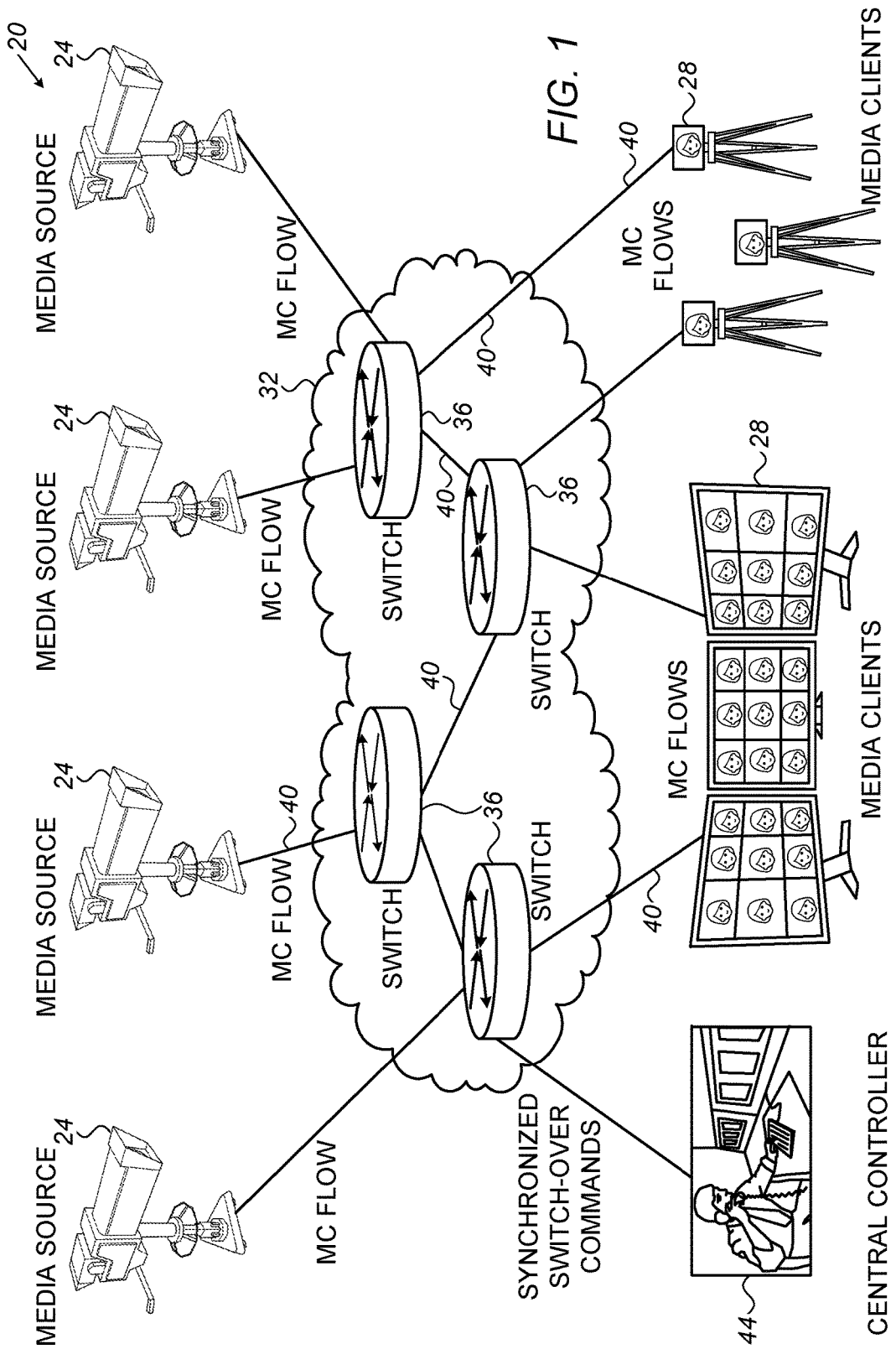
FIG. 1 is a block diagram that schematically illustrates a media production system, in accordance with an embodiment of the present invention.

Embodiments of the present invention that are described herein provide improved methods and systems for synchronized switch-over of multicast (MC) flows in communication networks. The embodiments described herein refer mainly to switch-over of MC flows that carry media content, such as in media production applications. The disclosed techniques, however, are applicable to other applications and use-cases, as well.

In some embodiments, a media production system comprises a first plurality of media sources that produce MC flows, and a second plurality of media clients that consume the MC flows. The MC flows carry video content, i.e., sequences of video frames. The sources and clients communicate over a packet network that comprises one or more network devices, such as switches or routers. At a given point in time, the system forwards each MC flow to a respective group of clients designated to receive that flow. For this purpose, each network device is provided in advance with a "MC configuration," which specifies the respective group of clients designated to receive each MC flow.

In some practical scenarios it is desirable to switch-over the entire system, synchronously, from the current MC configuration to a different MC configuration. Switching-over to a different MC configuration involves modifying the designated client group for at least one MC flow. Synchronizing the switch-over is advantageous, for example, for minimizing visible glitches and other undesired artifacts in the video displayed at the clients.

In some embodiments of the present invention, the system performs a switch-over process that is synchronized in two respects. At the individual MC flow level, the network devices switch-over between MC configurations at a boundary between video frames, not during a video frame. At the system level, the network devices synchronize the switch-over between MC configurations to the same video-frame boundary in all the MC flows. System-wide synchronization is advantageous, for example, in multi-screen clients that simultaneously display multiple video streams originating from multiple media sources.

In some embodiments, each network device determines the switch-over time by examining the packets in at least one of the MC flows, and extracting from the packets a value of a field that is indicative of the switch-over time. For example, when the media content in each MC flow is sent using Real-time Transport Protocol (RTP), the network device may examine the RTP timestamp field, which is time-dependent and is incremented at the video-frame boundary.

In a typical embodiment, a central controller sends the network devices a switch-over command that is indicative of the desired switch-over time, and possibly of the new MC configuration. The switch-over command may be sent, for example, several tens of milliseconds before the desired switch-over time, in order to allow sufficient time for the network devices to pre-configure the new MC configuration in preparation for the switch-over.

In these embodiments, the media sources are assumed to be time-synchronized with one another, e.g., using the Precision Time Protocol (PTP). Under this assumption, if each network device switches-over the MC configuration when the RTP timestamp is first incremented following reception of the switch-over command, the switch-over is guaranteed to be synchronized system-wide. Note that in this solution, it is sufficient for each network device to examine the RTP timestamps only in one of the multiple MC flows it handles.

The disclosed techniques enable an entire system, comprising multiple media sources, multiple media clients and multiple network devices, to perform system-wide synchronized switch-over between MC configurations. This synchronization is achieved without any requirement to time-synchronize the network devices with one another. Moreover, the disclosed switch-over process does not involve any overlap period during which a client has to receive MC flows belonging to both the old and the new MC configurations. The media clients are therefore not required to reserve extra bandwidth or other resources to support such an overlap.

System Description

FIG. 1 is a block diagram that schematically illustrates a media production system 20, in accordance with an embodiment of the present invention. System 20 comprises multiple media sources 24 and multiple media clients 28, which communicate over a communication network 32.

Sources 24 may comprise, for example, video cameras, video players or any other suitable type of equipment that generates media. Clients 28 may comprise, for example, video displays, multi-screen displays, computers that process video, video recorders, mixers, or any other suitable type of equipment that consumes media.

Network 32 may comprise any suitable type of packet network, for example a Local-Area Network (LAN) that operates in accordance with a suitable protocol such as Ethernet or Infiniband. Typically, network 32 comprises an Internet Protocol (IP) network. Network 32 comprises one or more network devices 36, e.g., switches or routers. The network devices are connected to one another, and to the media sources and media clients, using physical network links 40. Links 40 may comprise, for example, copper links or optical fibers.

Each media source 24 generates one or more media flows. Each media flow comprises a stream of multicast (MC) packets, which carries a sequence of video frames. The video-frame rate is considerably slower than the packet rate, i.e., each video frame spans multiple packets. The media flows are also referred to herein as MC flows, and the two terms are used interchangeably.

System 20 further comprises a central controller 44, typically implemented using a workstation or other suitable computer. Among other tasks, central controller 44 specifies the distribution of media flows from sources 24 to clients 28. A given MC flow may be distributed to a group of one or more clients 28. A given client 28 may receive one or more flows, originating from one or more sources 24. The system-wide configuration, which specifies the respective group of clients designated to receive each MC flow, is referred to herein as a "MC configuration."

In some embodiments, central controller 44 defines the MC configuration to be applied in system 20 at any given time. In addition, central controller 44 sends instructions to network devices 36 to switch-over from one MC configuration to another. Methods for synchronized switch-over between MC configurations, which are carried out by network devices 36, are described in detail below.

FIG. 2 is a block diagram that schematically illustrates a simplified internal structure of a network device 36, in accordance with an embodiment of the present invention. In the present example the network device comprises a packet switch. The switch comprises multiple ports 48 for connecting to respective links 40, and a configurable switch fabric 52 that forwards packets between ports 48. The switch further comprises a switch controller that configures fabric 52 and generally manages the operation of the switch. In some embodiments, switch controller 56 receives MC configurations from central controller 44, and configures fabric 52 to forward the MC flows according to the received MC configurations. In particular, switch controller 56 performs the MC configuration switch-over processes described below.

The configurations of system 20 and network device 36 shown in FIGS. 1 and 2 are example configurations that are depicted purely for the sake of conceptual clarity. In alternative embodiments, any other suitable network and/or network device configuration can be used. System and network-device elements that are not mandatory for understanding of the disclosed techniques have been omitted from the figures for the sake of clarity.

The different elements of network devices 36 may be implemented using any suitable hardware, such as in an Application-Specific Integrated Circuit (ASIC) or Field-Programmable Gate Array (FPGA). In some embodiments, some elements of network devices 36 can be implemented using software, or using a combination of hardware and software elements.

In the context of the present patent application and in the claims, fabric 52 and controller 56 are referred to as packet processing circuitry that carries out the disclosed techniques. In alternative embodiments, the packet processing circuitry can be implemented in any other suitable manner.

In some embodiments, central controller 44, and switch controllers 56 of network devices 36, comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

System-Wide Synchronized Switch-Over of Multicast Flows

In some embodiments, network devices 36 switch-over to a different MC configuration at a specified switch-over time, which is synchronized to a specific video-frame boundary across the entire system 20. An underlying assumption is that media sources 24 are time-synchronized with one another with regard to the video-frame timing. In other words, it is assumed that the boundary between the video frames occurs at the same time in all media sources.

In a real-life implementation, the synchronization of the video-frame boundary between different MC flows may vary slightly, e.g., due to residual timing offsets between media sources and processing-time differences in network 32. Typically, although not necessarily, such synchronization offsets are on the order of several tens of microseconds. Thus, when switching from one MC configuration to another in a network device 36, a particular MC flow may experience a transient of this size. Media clients 28 are typically configured to handle such transients with little or no noticeable degradation in video quality.

In some embodiments, each MC flow in system 20 comprises an RTP flow as specified, for example, in RFC 3550, cited above. In particular, the packets of each MC flow comprise an RTP timestamp as specified, for example, in RFC 4175, cited above. The RTP timestamp serves as a sequence number for the video frames, and is incremented at the video-frame boundary. In these embodiments, controllers 56 of network devices 36 identify the boundary between successive video frames by detecting that the RTP timestamp is incremented. The RTP timestamp is located at a known fixed offset from the beginning of the packet, specified in RFC 4175, and controllers 56 use this offset to access the appropriate location in the packets.

In these embodiments, central controller 44 decides that a switch-over to a new MC configuration is to be performed system-wide at a certain time. Having decided on the desired switch-over time, central controller 44 sends a switch-over command to network devices 36, instructing them to perform the switch-over. The switch-over command typically specifies the time remaining until the switch-over time, or any other indication that enables the network devices to choose the correct video-frame boundary at which to perform the switch-over. In an example embodiment, the central controller sends the switch-over command a predefined time period prior to the desired switch-over time, e.g., 60 mS ahead. The network devices are aware of this time period, and can therefore select the correct video-frame boundary at which to perform the switch-over to the new MC configuration.

In some embodiments, the switch-over command may also specify the new MC configuration to be applied. Alternatively, the new MC configuration may be provided to the network devices at any other suitable time and in any other suitable way.

FIG. 3 is a flow chart that schematically illustrates a method for switch-over of MC flows, in accordance with an embodiment of the present invention. This method is typically carried out by each network device 36 in system 20, independently of the other network devices and regardless of any time synchronization with any other network device. The assumption is that, when appropriate, central controller 44 issues a switch-over command that notifies network devices 36 of the desired switch-over time (desired video-frame boundary) and the new MC configuration.

The method begins with network device 36 processing multiple MC flows, at a processing step 60. Typically, network device 36 receives multiple MC flows via ports 48. Switch fabric 52 forwards each MC flow to its designated group of clients 28 via ports 40, in accordance with the currently-applicable MC configuration. Fabric 52 is configured with the currently-applicable MC configuration by controller 56.

At a timestamp extraction step 64, controller 56 in network device 36 extracts the RTP timestamps from one or more packets in one or more of the MC flows. In an example embodiment, controller 56 configures fabric 52 to temporarily mirror the packets of one of the MC flows to controller 56 for examination. Controller 56 then extracts the RTP timestamps from this flow. The RTP timestamp extraction is performed in parallel to the normal forwarding of the MC flow by fabric 52.

Since the video-frame boundaries are assumed to be synchronized (up to some finite offset as explained above) among media sources 24 (and therefore among the various MC flows), it is sufficient for controller 56 to examine the RTP timestamps of only a single MC flow. The actual value of the RTP timestamp may vary slightly from one MC flow to another.

At a checking step 68, fabric 52 checks whether the RTP timestamp(s) extracted at step 64 above indicate that a switch-over of MC configuration is to be performed. If no switch-over is to be performed, the method loops back to step 60. Otherwise, i.e., if switch-over is to be performed, fabric 52 begins to process the MC flows in accordance with the new MC configuration, as instructed by central controller 44. The method then loops back to step 60.

The method of FIG. 3 is an example method that is depicted purely for the sake of conceptual clarity. In alternative embodiments, network devices 36 may use any other suitable method for carrying out synchronized switch-over of the MC configuration. For example, alternatively to examining RTP timestamps, controllers 56 may examine any other suitable packet field value that is indicative of video-frame boundary.

Figure 4A:
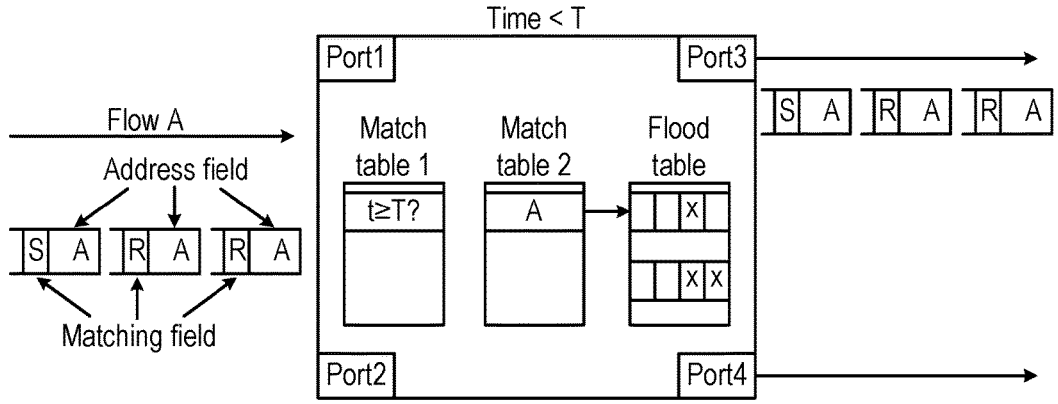
FIGS. 4A-4C are diagrams that schematically illustrate an implementation of multicast flow switch-over in a network device, in accordance with an embodiment of the present invention.
Figure 4B:
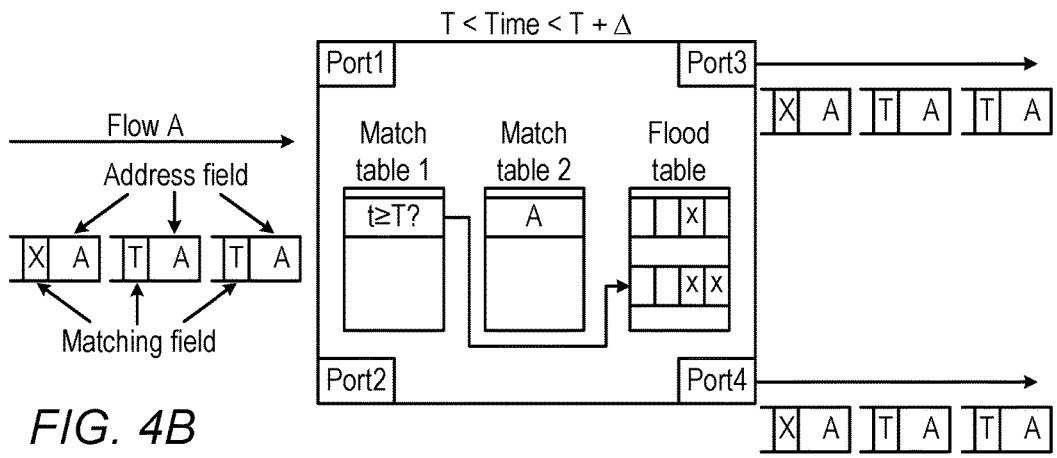
Figure 4C:
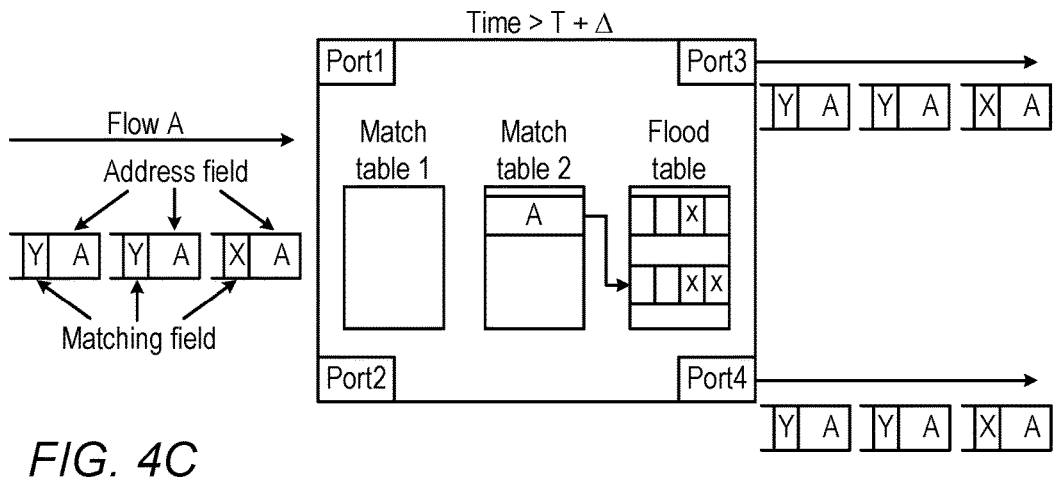

FIGS. 4A-4C are diagrams that schematically illustrate an example implementation of MC flow switch-over in network device 36, in accordance with an embodiment of the present invention. In the present example, a MC flow denoted "Flow A" enters the network device at an egress port denoted "Port1". In accordance with the initial MC configuration, shown in FIG. 4A, Flow A is forwarded to a single egress port denoted "Port2". At a time denoted "T", the network device switches-over to a new MC configuration, shown in FIG. 4C, in which Flow A is forwarded to two egress ports denoted "Port3" and "Port4". FIG. 4B illustrates an intermediate stage during the switch-over process, which is described below. Transitioning between the three stages is decided and performed by controller 56 of the network device.

In the example implementation of FIGS. 4A-4C, the packet processing circuitry of the network device comprises three tables denoted "Match_table_1", "Match_table_2" and "Flood_table". The Flood_table holds the definitions of the two MC configurations (the initial MC configuration applicable up to time T, and the new MC configuration applicable from time T). Match_table_1 holds a rule that checks whether the current time t is equal to or greater than the switch-over time T ("t≥T?"). Match_table_2 holds the parameters (e.g., 5-tuple) of Flow A, for identifying the packets belonging to Flow A and forwarding them in accordance with the currently-applicable MC configuration.

The three tables, and the logic that accesses the tables and compares table entries with packet attributes, may be implemented, for example, as part of fabric 52. The tables are populated and otherwise managed by controller 56. It should be noted, however, that the implementation shown in FIGS. 4A-4C is depicted purely by way of example and that the functionality carried out by the tree tables can be implemented in various other ways.

Before time T, as seen in FIG. 4A, the entry that matches Flow A in Match_table_2 points to the initial MC configuration in the Flood_table. Therefore, at this stage, fabric 52 forwards packets belonging to Flow A to Port 3 only. Forwarding in accordance with the initial MC configuration continues as long as the time comparison in Match_table_1 concludes that t<T.

When the time comparison in Match_table_1 first detects that t≥T, controller 56 transitions to the intermediate stage seen in FIG. 4B. (In an embodiment, controller 56 of network device 36 is notified by a mirrored packet that fabric 52 has started switching in accordance with Match_table_1.) The intermediate stage of FIG. 4B typically spans the time interval T<t≤T+Δ. During the intermediate stage, Match_table_1 has precedence over Match_table_2. At this stage controller 56 updates the entry of Flow A in Match_table_2 to point to the new MC configuration in the Flood_table. During the intermediate stage, fabric 52 already forwards packets belonging to Flow A in accordance with the new MC configuration, i.e., to both Port 3 and Port 4.

Once the update of Match_table_2 is completed, controller 56 proceeds to the stage shown in FIG. 4C. The entry that matches Flow A in Matching table 2 points to the new MC configuration in the Flood_table. Fabric 52 thus forwards the packets of Flow A in accordance with the new MC configuration.

As can also be seen in FIG. 4C, at this stage controller 56 has deleted the rule "t≥T?" from Match_table_1. Since time T has passed, this rule is obsolete and there is no need to evaluate it any longer. Typically, Match_table_1 is expensive both in terms of cost and size and in terms of lookup complexity, since its rules involve examination of the packet payload. As such, it is highly desirable to remove obsolete rules as soon as possible, in order to keep the table as small as possible and minimize the number of rule evaluation operations.

Although the embodiments described herein mainly address MC flows that carry media content, such as in media production and IPTV applications, the methods and systems described herein can also be used in other applications that can benefit from synchronized switch-over of MC flows, such as financial/algorithmic trading systems.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network device, comprising:
multiple ports, for communicating over a communication network; and
packet processing circuitry, configured to:
receive via the ports packets belonging to a plurality of multicast flows;
receive, for each of the multicast flows, (i) a first configuration that specifies a respective first group of clients that are to receive the multicast flow prior to a specified switch-over time, and (ii) a second configuration that specifies a respective second group of clients that are to receive the multicast flow after the specified switch-over time;
forward the multicast flows via the ports in accordance with the first configuration;
extract from a field in at least one of the packets a value that is indicative of the switch-over time; and
based on the extracted value, switch-over forwarding of each of the multicast flows from the respective first group of clients to the respective second group of clients at the switch-over time, simultaneously both (i) for all the clients associated with each multicast flow and (ii) for all the multicast flows forwarded by the network device.

2. The network device according to claim 1, wherein the multicast flows comprise Real-time Transport Protocol (RTP) media flows, and wherein the extracted value comprises an RTP timestamp.

3. The network device according to claim 1, wherein the multicast flows convey video frames, and wherein the packet processing circuitry is configured to determine a video-frame boundary based on the extracted value, and to switch-over to the second configuration at the video-frame boundary.

4. The network device according to claim 1, wherein the packet processing circuitry is configured to extract the value from a single selected multicast flow, and to switch-over all the multicast flows to the second configuration at the switch-over time indicated by the single selected multicast flow.

5. The network device according to claim 1, wherein the packet processing circuitry is configured to determine the switch-over time, and to switch-over to the second configuration, irrespective of time synchronization with any other network device.

6. The network device according to claim 1, wherein the packet processing circuitry comprises a table, which holds a rule that triggers a switch-over to the second configuration based on the extracted value.

7. The network device according to claim 6, wherein the packet processing circuitry is configured to delete the rule from the table after the switch-over to the second configuration has been triggered.

8. The network device according to claim 1, wherein the packet processing circuitry is configured to forward the multicast flows by looking-up a table, which points to the first configuration prior to the switch-over time and to the second configuration after the switch-over time.

9. The network device according to claim 8, wherein, in response to a decision to switch-over to the second configuration, the packet processing circuitry is configured to update the table to point to the second configuration.

10. A method, comprising:
receiving in a network device packets belonging to a plurality of multicast flows;
receiving in the network device, for each of the multicast flows, (i) a first configuration that specifies a respective first group of clients that are to receive the multicast flow prior to a specified switch-over time, and (ii) a second configuration that specifies a respective second group of clients that are to receive the multicast flow after the specified switch-over time;
forwarding the multicast flows in accordance with the first configuration;
extracting from a field in at least one of the packets a value that is indicative of the switch-over time; and
based on the extracted value, switching-over forwarding of each of the multicast flows from the respective first group of clients to the respective second group of clients simultaneously at the switch-over time, simultaneously both (i) for all the clients associated with each multicast flow and (ii) for all the multicast flows forwarded by the network device.

11. The method according to claim 10, wherein the multicast flows comprise Real-time Transport Protocol (RTP) media flows, and wherein the extracted value comprises an RTP timestamp.

12. The method according to claim 10, wherein the multicast flows convey video frames, and wherein switching-over to the second configuration comprises determining a video-frame boundary based on the extracted value, and switching-over to the second configuration at the video-frame boundary.

13. The method according to claim 10, wherein extracting the value comprises extracting the value from a single selected multicast flow, and wherein switching-over to the second configuration comprises switching-over all the multicast flows to the second configuration at the switch-over time indicated by the single selected multicast flow.

14. The method according to claim 10, and comprising determining the switch-over time, and switching-over to the second configuration, by the network device irrespective of time synchronization with any other network device.

15. The method according to claim 10, wherein switching-over to the second configuration comprises looking-up a table, which holds a rule that triggers a switch-over to the second configuration based on the extracted value.

16. The method according to claim 15, and comprising deleting the rule from the table after the switch-over to the second configuration has been triggered.

17. The method according to claim 10, wherein forwarding the multicast flows comprises looking-up a table, which points to the first configuration prior to the switch-over time and to the second configuration after the switch-over time.

18. The method according to claim 17, and comprising, in response to a decision to switch-over to the second configuration, updating the table to point to the second configuration.

* * * * *